United States Patent [19]
Barriere et al.

[11] 3,760,416
[45] Sept. 18, 1973

[54] RUNWAY TRAFFIC SURVEILLANCE DEVICE

[75] Inventors: Georges J. J. Barriere, Le Mesnil-Saint-Denis; Michel Rene J. Dalbera, Chatillon-Sous-Bagneux, both of France

[73] Assignee: International Standard Electric Corporation, New York, N.Y.

[22] Filed: Nov. 24, 1971

[21] Appl. No.: 201,748

[30] Foreign Application Priority Data

Nov. 30, 1970 France .................... 7042944

[52] U.S. Cl. ........ 343/7 ED, 343/5 PC, 343/112 CA
[51] Int. Cl. ........................... G01s 7/04, G01s 9/42
[58] Field of Search ............... 343/112 CA, 112 TC, 343/7 ED, 5 PC

[56] References Cited
UNITED STATES PATENTS

| | | | |
|---|---|---|---|
| 3,001,192 | 9/1961 | Hammond, Jr. et al. | 343/5 PC |
| 3,095,560 | 6/1963 | Castellini | 343/112 CA |
| 3,550,126 | 12/1970 | Van Hijfte et al. | 343/7.3 X |
| 2,824,271 | 2/1958 | Anderson et al. | 343/5 PC |
| 3,149,325 | 9/1964 | Kellogg | 343/7 ED X |

Primary Examiner—Malcolm F. Hubler
Attorney—C. Cornell Remsen, Jr. et al.

[57] ABSTRACT

A radar surveillance device particularly adapted for airport surface monitoring, including a fixed pointing monopulse radar and tracking circuits for selected targets. Radar derived data such as data on range, azimuth (bearing) angle, speed in analog or digital form are continuously recorded in a transient (repetitive) recording as, for example, in a continuous belt magnetic tape recorder. A continuous comparison of radar derived data with built-in limits produces an alarm signal whenever one or more of said data items reaches its build-in limit. The alarm signal can alert tower personnel but also activates a transfer of recorded data from the transient (first) to more permanent (second) recording means. In one embodiment, the time retention capacity of the first recording means is used to hold data for one such period preceding an alarm signal, the recording being shifted to the second recorder during the presence of an alarm signal. In another embodiment, a read-out from the first recorder is activated by the alarm signal and the data read-out is recorded in the second recorder so that a complete second recorder record is extant including the data in the holding period of the first recorder one predetermined holding period prior to the alarm.

A continuous record for accident investigations and airport traffic monitoring purposes is thus available.

10 Claims, 4 Drawing Figures

RUNWAY TRAFFIC SURVEILLANCE DEVICE

CROSS REFERENCE TO RELATED APPLICATIONS

This application is filed under the provisions of 35 U.S.C. 119 with claim for the benefit of the filing of an application covering the same invention filed Nov. 30, 1970, Ser. No. 70 42944, in France.

BACKGROUND OF THE INVENTION

1. Field of the Invention

The present invention relates to surface electronic surveillance systems such as, for example, airport runway surveillance systems, utilizing radar detection.

2. Description of the Prior Art

It is of particular interest, especially in low visibility conditions, to know with accuracy every movement occurring on an airport runway. That knowledge affords the opportunity of avoiding accident risks due to obstacle intrusion onto the runway (land vehicles, etc.) and also provides instantaneous warning of anomalies affecting aircraft landing or take-off movements. It is known to use a simultaneous cross-beam coherent Doppler radar located at runway end so that the beam thereof entirely covers the runway. Such a radar, frequently called a monopulse radar, makes it possible to perform one or several contemporaneous trackings and to obtain therefrom, for each target in a predetermined area, magnitude and sense of angular error between antenna axis and target bearing, target range from the radar, and also target speed and acceleration when the target is being actively tracked. From such data, there may be generated a number of alarm signals to alert tower controllers (for example) and providing them with data about anomalies occurring within the surveillance area or concerning tracked target movements.

Such a surveillance radar has been described in the French Pat. application No. 70 32847 filed on Sept. 10, 1970 in the name of the present applicant and assignee, entitled "Perfectionnements aux radars de surveillance de zones telles qu'une piste d'aerodrome" (Improvements to radars for the surveillance of area such as airport runways). A corresponding U.S. Pat. application is entitled "Surveillance Doppler Radars," Ser. No. 178,665 filed Sept. 8, 1971, now U.S. Pat. No. 3,717,874.

SUch a surveillance radar provides continuous accurate data concerning the behavior of tracked aircraft for generating alarm signals, but without recorded record. The lack of a recorded record, as for example, for accident investigation, is a disadvantage of such systems.

The general art in respect to monopulse and tracking radar as described in the textbook "Radar Handbook" by Merrill Skolnik (a McGraw Hill book, 1970) is pertinent as background for the present invention.

SUMMARY

It has been found that the ability to store data describing aircraft behavior during periods in which an alarm signal corresponding to a specific event or occurrence is extant. The alarm signal designates a situation in which accident hazard exists.

The continuous recording of all data for every target tracked by the surveillance radar in continuous operation is obviously costly and cumbersome, accordingly, it is the general object of the present invention to provide a recording system associated with a surveillance radar for selective permanent storage of data considered of interest based on predetermined criteria.

According to the invention, a predetermined area surveillance radar system comprising a simultaneous cross-beam coherent Doppler radar is provided. The antenna of the system is fixed and predirected toward the predetermined area. Threshold circuits receive the radar sum and difference signals for selecting echoes returned by targets located inside said predetermined area. Tracking circuits are included for tracking certain of said targets, and circuits are also included for generating alarm signals based on comparison of the signals provided by said threshold circuits and said tracking circuits. A temporary storage device continuously records (for a predetermined recycling time interval) the data provided by said radar relating to each tracked target. When triggered by one or more of the predetermined alarm signals, the data (including range and bearing information) concerning information) concerning tracked target which caused the alarm signal is permanently recorded in an addition storage device, beginning said predetermined interval ahead of said alarm.

The above mentioned and other features and objects of this invention will become more apparent, and the invention itself will be best understood by reference to the following detailed description of an embodiment of the invention taken in conjunction with the accompanying drawings.

DESCRIPTION OF THE PREFERRED EMBODIMENT

Figure 1:
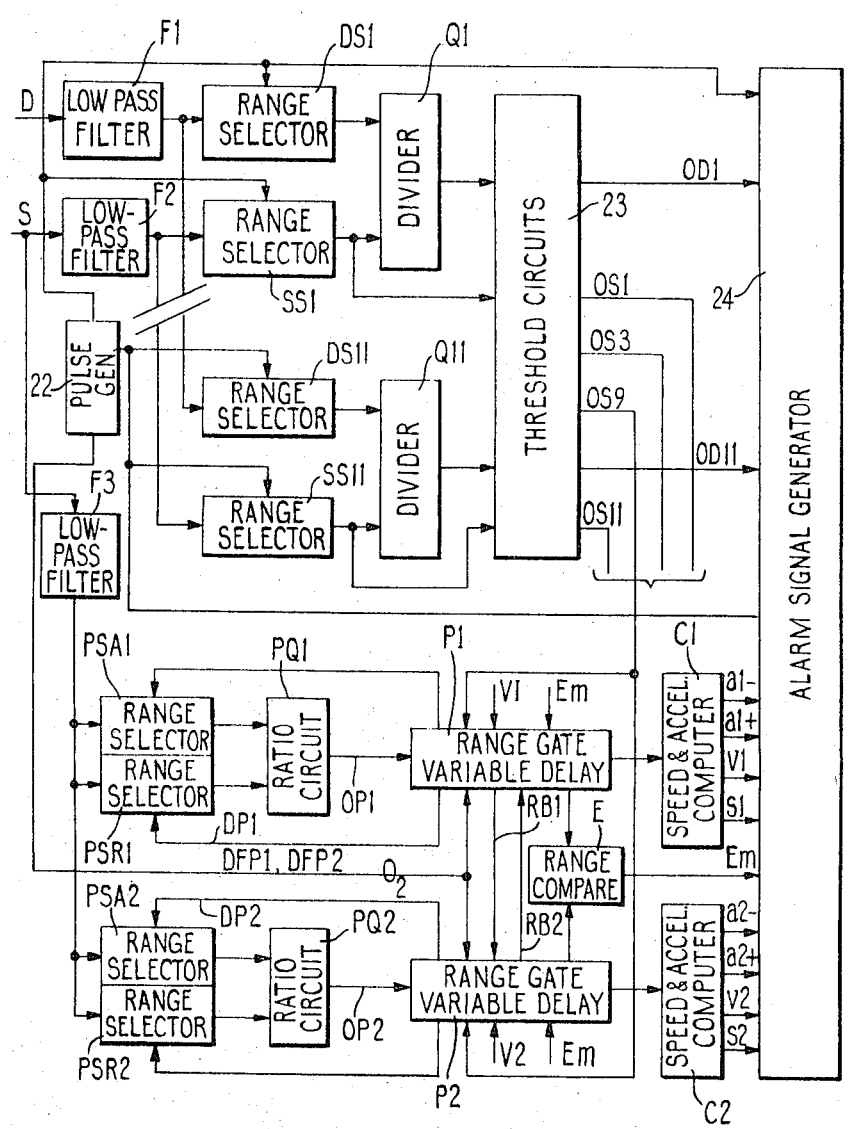
FIG. 1 illustrates a block diagram of a prior art surveillance Doppler radar.

By way of example, the invention will be described as applied to the airport runway surveillance application.

Obviously, for safety reasons, only an aircraft which is cleared to land or take off, to the exclusion of any other vehicle or obstacle, can be permitted to be present on or over the runway. It is also obvious that other vehicles (planes traversing or stopped on taxiways, services vehicles, etc.) have to be sufficiently far from the runway in use to comply with the defined safety area surrounding the runway.

For the surveillance of any vehicle movement inside this area, it has been proposed in the aforementioned prior art to employ a monopulse Doppler radar.

At the outset, the technique and instrumentation of a mono-pulse Doppler radar for the purpose (including signal processing for effecting such surveillance) will be briefly reviewed. A conventional monopulse radar typically includes an antenna having two primary sources illuminating one antenna in such a way that radiation patterns are symmetrical with respect to the antenna axis (boresight) and overlap each other. Signals received by receiving channels corresponding to the two sources are respectively added in phase and in phase opposition, the resulting signals being respectively processed in what is commonly called the "sum" and "difference" channels. Thus, there are provided two phase discriminators outputs connected to be compared to a coherent oscillator, a signal S, called sum signal, and a signal D, called difference signal. The signal S provides data about range of the received echoes and the ratio D/S provides a measure (for small angular deviations) of amplitude and sign of angular deviation between antenna axis and echo reception direction.

Signals S and D are conveyed, via low-pass filters F1 and F2, to two series of range selectors DS1 to DS11, and SS1 to SS11. Each of these selects that echo signal returned by such target as may be located in the corresponding one out of the n adjacent, relatively small, range increments of the surveillance area (corresponding to the reference number of the corresponding range selector for convenience). In the FIG. 1 system, 11 range slices or increments, were employed. Obviously, in practice, a normal runway would be divided into a higher number of such increments, example 50 to 100. The range "width" represented by each will be seen to be correspondingly small.

Signals from a range selector pair (for example, DS1 and SS1), corresponding to a predetermined range increment, are applied to a circuit for computing the quotient (for example divider Q1) which provides the corresponding target's angular deviation. A threshold circuit 23 operates to angularly limit the various range increments D1 to D11. The circuit 23 provides signals OD1 to OD11 if there is a target in the angular limited respective range increment. Circuit 23, moreover, includes electronic gates for passing the sum channel signal OS1 to OS11, if the corresponding OD signal is extant.

In addition, the signal S is applied, via the low-pass filter F3, to two tracking circuits, each comprising two adjacent range selectors, PSA1 and PSR1 (or PSA2 and PSR2) and a circuit PQ1 (or PQ2) for computing the ratio of the signal delivered by the two range selectors, the latter providing a deviation signal OP1 (or OP2) having its amplitude proportional to the deviation between the echo signal center and the common side of the two adjacent tracking range gates. Also included in the tracking arrangement is a circuit P1 (or P2) for providing a signal DP1 (or DP2) for moving or variably delaying the range gates. The circuit P1 provides a signal RB1 indicating, with a delay R, that the tracking loop is closed on a target, and an analog signal measuring the tracked target radar range which is applied to a computer circuit C1 computing the tracked target speed and acceleration and generating signals S1, indicating by its presence or absence that the target is landing or taking off, respectively. A signal VI indicates that the target speed has become lower than a predetermined value, and a1+ and a1− define the tracked target acceleration sense. A range comparator circuit E generates a signal Em if the distance between the two tracking pulses DP1 and DP2 is less than a predetermined minimum. A pulse generator circuit 22 provides, for each repetition period, pulses defining the range increments D1 to D11 for the selectors DS1 to DS11 and SS1 to SS11, as well as pulses DFP1 and DFP2 defining two runway end areas located on both sides of the area D1–D11. Signals OD1 to OD11, a1+, a1−, etc. are provided to the alarm signal generator circuit 24. By way of a general example, the following alarm signal designations may be arbitrarily adopted.

The prior art patent literature, hereinbefore referred to, details the generation of these modes of alarm condition.

| Signal | Meaning |
|---|---|
| A1 | Distance between tracking pulses shorter than a predetermined value. |
| A2 | Landing in direct direction before runway beginning (short of runway landing) |
| A3 | Landing in reverse direction before runway beginning (reverse short landing) |
| A4 | Landing in direct direction after runway end (long landing) |
| A5 | Landing in reverse direction after runway end (reverse long landing) |
| | Landing in direct direction outside strip limits |
| A7 | Landing in reverse direction outside strip limits |
| A8 | Too short take - direct direction |
| A9 | Too short take - reverse direction |
| A10 | Tracking 1 acceleration reversal, when landing |
| A11 | Tracking 1 acceleration reversal, when taking off |
| A12 | Tracking 2 acceleration reversal, when landing |
| A13 | Tracking 2 acceleration reversal, when taking off |
| A14 | Detection of one or several bogie echoes within D1 to D11 which are not tracked |
| A15 | Simultaneous occurrence of echoes in two range increments corresponding to runway access. |

Obviously, in case of accident or risk producing anomaly, it is of great interest to detect and store data concerning aircraft movements during at least a nominal time period preceding the accident or the said anomaly.

By way of example, data which may be considered as of interest, are; position of aircraft, speed with respec to ground, acceleration and angular deviation with respect to runway axis. For defining a time scale for those data, the time origin for an aircraft may be considered to be the moment it was accepted in the tracking loop.

The aircraft position may be defined as the range of the plane to a fixed point such as the theoretical point where the plane should touch down the ground ("touch-down point"), when landing. For take-off, the distance from the plane to the point where the lift-off actually begins may be used and, for reason of simplification, it will be considered that this point is substantially the same as the touch-down point.

Figure 2:
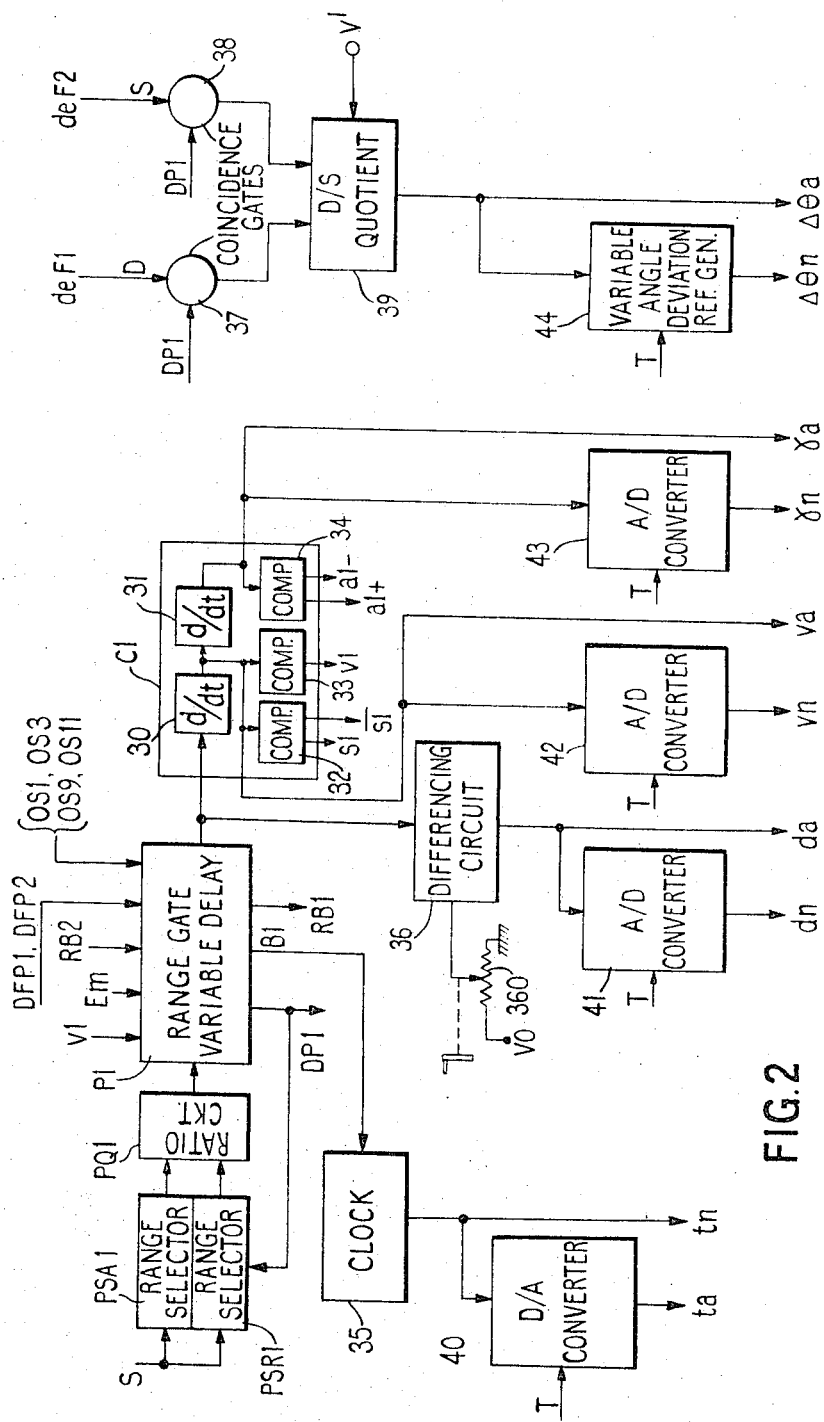
FIG. 2 shows an embodiment of circuits for extracting and shaping data to be recorded, according to the invention.

Referring now to FIG. 2, instrumentation for extracting and shaping data to be stored will be described. That data is available simultaneously as analog data (reference index $a$) and as digital data (reference index $n$). Only circuits concerning the tracking loop 1 are shown, it being understood that duplicate circuits are provided for tracking loop 2. Circuits P1, for generating the tracking range gate DP1, the position of which with respect to the radar transmitted pulse characterizes the distance from the tracked target to the radar, also provide a signal B1 during the closed tracking loop condition, as hereabove mentioned, in the form of a target range analog signal which is subsequently applied to the circuit C1. The circuit C1 comprises two differentiator (d/dt) circuits 30 and 31. The circuit 30 receiving the range signal provides the speed as a first derivative of range and the circuit 31 receiving the speed signal provides acceleration as a second derivative of the tracked target range. A comparator circuit 32 provides the signals S1 and $\overline{S1}$ defining the condition of landing or of take-off, by comparing the target speed with a preselected reference speed. A small delay to allow for settle-down time delays this computation until a predetermined time after tracking loop closure.

Comparator circuit 33 compares the target speed with another preselected value and provides the results as signal V1. Comparator circuit 34 provides the signal $a1-$ if speed is decreasing and the signal $a1+$ if it is increasing.

Range data delivered at the output of the circuit P1 are applied to a differencing circuit 36 providing the difference ($da$) between this signal and an adjustable fixed reference voltage applied to its second input. That reference voltage is adjusted to a value corresponding to the range from the radar to the touch-down point, for the particular corresponding runway utilization direction.

The circuit generating such voltage (this reference) is symbolized by a potentiometer 360 operating from a fixed voltage source VO and manually controlled. Of course, any other equivalent device, either manually or automatically controlled, may be used to provide this function.

Accordingly, the circuit 36 provides under analog form the distance from the target to the touch-down point, such distance being called da.

An analog-to-digital converter 41 provides that distance in digital form, i.e., $dn$.

The circuits 30 and 31 provide analog signals for, respectively, target speed ($va$) and acceleration ($\gamma a$) and analog-to-digital converters 42 and 43 provide corresponding digital values $vn$ and $\gamma n$.

The angular deviation value from target to runway axis is obtained from difference signal D and sum signal S respectively delivered by the low-pass filters F1 and F2 (see FIG. 1). For computing the angular deviation exclusively for the tracked target, two coincidence electronic gates 37 and 38 select in signals D and S the signal increment corresponding to the tracked target. Accordingly, those gates are opened by the range gate DP1. The signals thus selected are applied to a circuit 39 which performs the quotient D/S and which provides for correction of the angular deviation signal in accordance with a dc reference voltage V' applied to its second input. This reference voltage V' makes it possible to obtain the angular deviation signal $\Delta \theta a$ with respect to runway axis (which it represents). If the radar is located along the prolongation of the runway axis, the voltage V' is a constant value. If the radar is not located along the prolongation of the runway axis, V' must be continuously variable as a function of the target range from the radar. An analog-to-digital converter 44 (variable angle deviation reference generator) provides the digital value $\Delta \theta n$ of the angular deviation.

Finally, the signal B1 for closing the tracking loop triggers a clock 35 providing time pulses $tn$. A digital-to-analog converter 40 provides analog time data $ta$.

The converters 40 through 44 deliver data bits forming series messages and have bit durations determined for compatibility with the recording system which will be hereinafter described. The required adjustment may be made simply by appropriate selection of the period T of the clock signals provided to the said converters.

Figure 3:
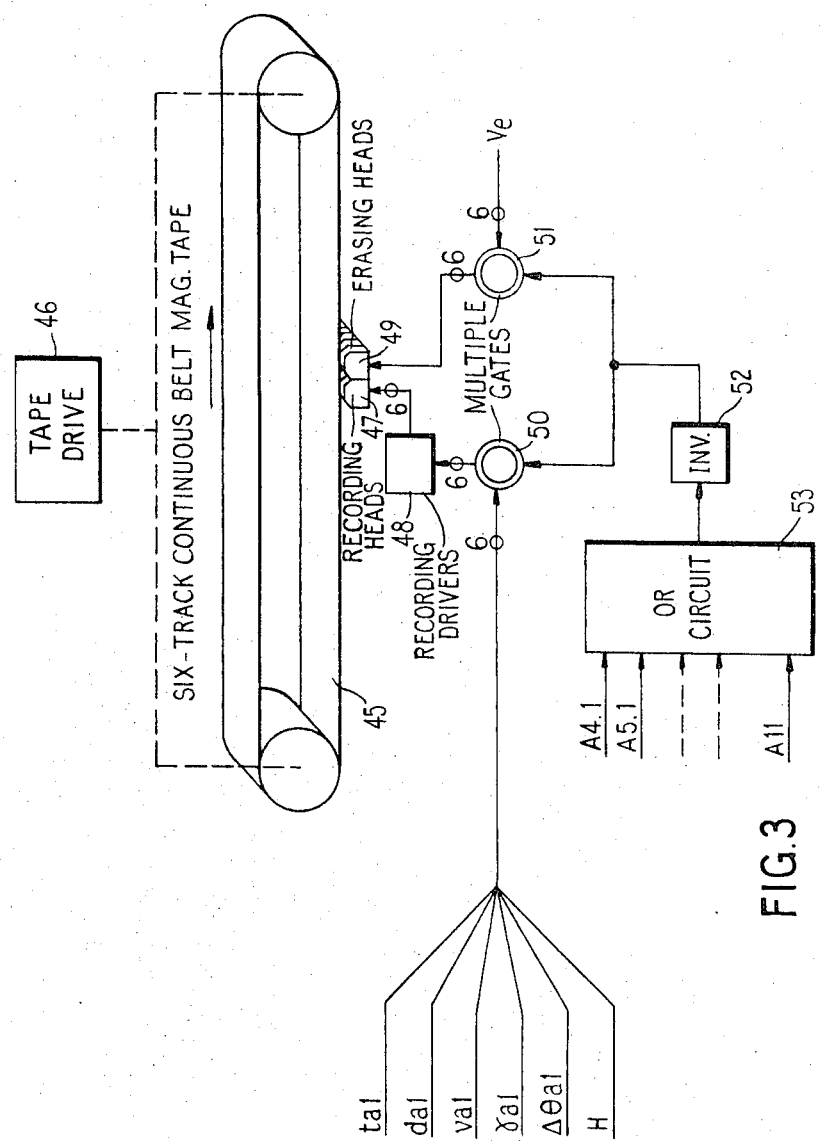
FIG. 3 shows a form of recording system suitable for use with the invention.

Referring now to FIG. 3, a first embodiment of a recording system according to the invention will be described. In this embodiment, data relating to each tracked target are stored on multiple-track looped magnetic tapes. A tape for each tracking loop is provided and each tape has as many tracks as there are data items to store in respect to each tracking loop.

In FIG. 3, only the recording system for the tracking loop 1 is shown. It comprises a six-track continuous belt magnetic tape 45 forming a loop and continuously driven in the direction of the arrow by a driving device 46.

In its travel, the tape 45 first passes an erasing head bank 49, then in front of a recording head 47, adjacent or very close to the head 49.

Block 48 represents conventional recording drivers as used in well known magnetic recording devices.

Circuits 48 receive the six data items to be registered via a multiple gate circuit 50. The six data are, in that example, analog signals, but could also be digital signals, and include $tal$ (tracking start time), range to touch-down point ($da1$), target speed ($va1$), acceleration ($\gamma a1$), deviation with respect to runway axis ($\Delta \theta a1$) and actual time H obtained, for instance, from the control tower clock. The erasing head 49 is supplied with erasing signals ($Ve$) via a second multiple gate circuit 51. The two gate circuits are simultaneously switched on under the control of a signal provided by an OR circuit 53 via an inverter 52.

The OR circuit 53 receives various predetermined alarm signals selected among those alarm signals delivered by the circuit 24 of FIG. 1. By way of example, the following alarms have been selected, corresponding to select accident hazard conditions. Alarms A4.1 and A5.1 which are specific for long landing (beyond runway end), for the plane subject to tracking loop 1 control. Alarms A6.1 and A7.1 concerning landing outside of strip limits. Alarms A8.1 and A9.1 concerning short take-off. Alarm A11 concerning acceleration reversal on take-off.

Of course, any other alarm signal could be selected which would appear to require permanent recording.

The recording system according to the invention operates as follows: In a normal traffic period, there is no alarm signal and, via the inverter 52, the multiple gates 50 and 51 are always on.

Data stored on the tape 45 are continuously erased by the head 49 and new data values are continuously recorded by the head 47.

The data stored at a given time remain stored during the time period between their recordings by the head 47 and their later erasing by the head 49. Whenever one of the above mentioned alarm signals appears, relating to the tracking loop 1, the two gates 50 and 51 are switched off. No new data is thus recorded and existing stored data, recorded a time period preceding the alarm, are no longer erased and remain stored. Therefore, it is sufficient to remove the tape 45 at the alarm time for keeping a record of the tracked plane behavior during the time period before alarm occurs. A new tape is installed and normal recording may start again.

The length of the tape 45 is selected so that the recording duration makes it possible to trace back far enough before the alarm signal appears to provide meaningful reportage of events leading to the alarm condition.

For example, a duration of about one minute may be selected if only the runway is subject to surveillance, as has been assumed hereabove.

Obviously, however, the surveillance are can be enlarged so as to track aircraft from the point where planes are theoretically in alignment with a prolongation of the runway axis (final approach). In that case, a recording duration of 3 minutes may be selected and more than two tracking loops should be provided since, within the surveillance area of a busy airport, there can easily be more than two aircraft at a time.

Figure 4:
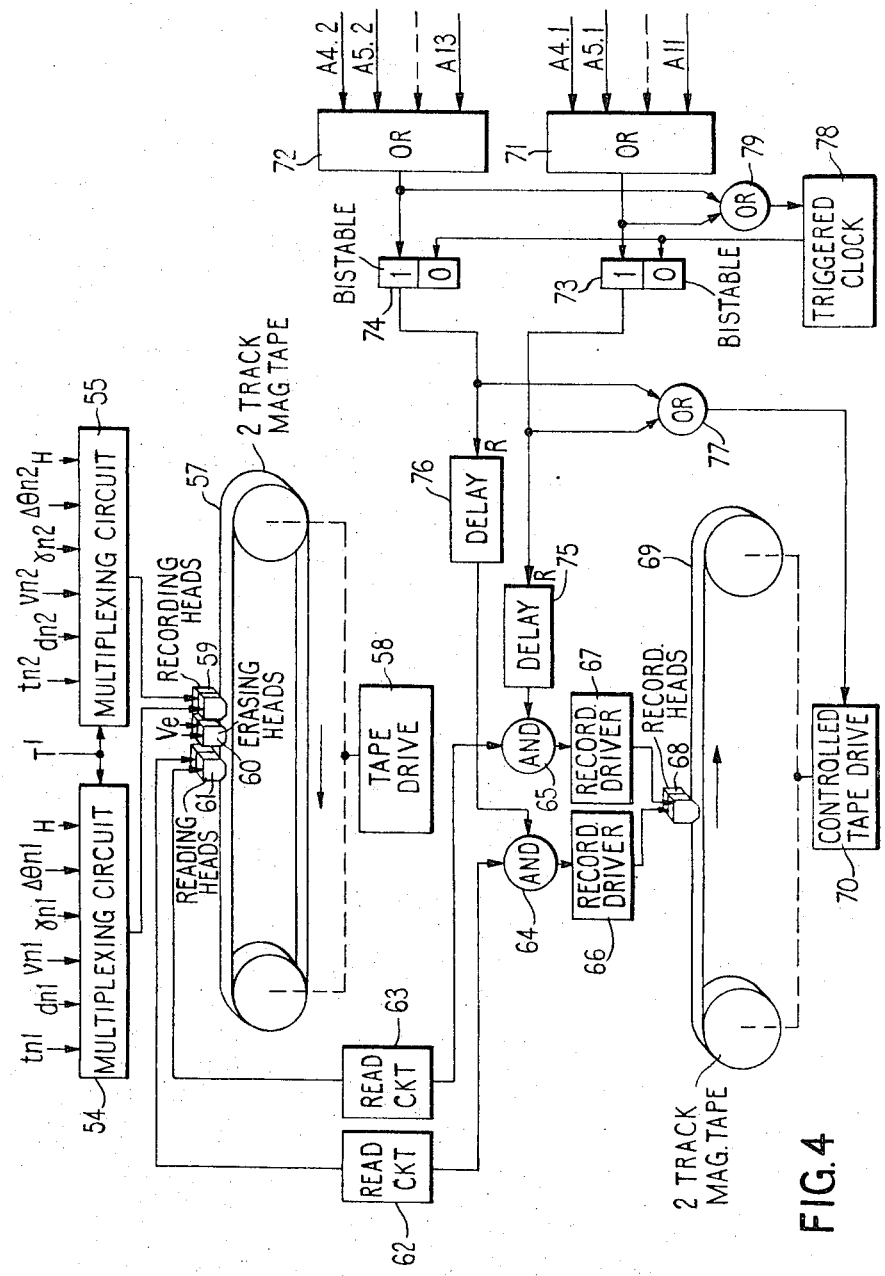
FIG. 4 shows a diagram of an alternative embodiment of the recording system according to the invention.

FIG. 4 shows another embodiment according to the invention wherein there is no interruption of the recording process even if an alarm occurs.

In this embodiment, data concerning a target are time multiplexed, as digital signals (for example) and stored on only one track of a magnetic tape comprising as many tracks as there are tracking loops. By way of example and for the sake of clarity, only two tracking loops are considered. The same data to be stored as in the first embodiment have been selected.

Data $tn1$, $dn1$, $vn1$, $\gamma n1$, $\Delta \theta n1$ and H from the tracking loop 1 are multiplexed in a multiplexing circuit 54 of any known type while data from the tracking loop 2 are multiplexed in the circuit 55. The circuits 54 and 55 receive the needed clock signals T'. Multiplexed signals are recorded via the recording heads 59 on the two tracks, respectively, of a magnetic tape 57 forming a loop and which is continuously driven in the direction of the arrow by a driving device 58.

An erasing head 60 is located just before the head 59 and receives continuously erasing signals Ve. Finally, a reading head 61 is located just ahead of the erasing head. The head 61 is connected to the reading circuits 63 and 62 of the tracks 1 and 2 of the tape 57, respectively.

A second two-track magnetic tape 69 which does not form a loop like 57, is driven in the direction of the arrow by a controlled driving device 70, thereby providing a considerably longer recording time capability.

Recording on the tape 69 is accomplished via the magnetic head 68. Read signals provided by reading circuits 63 and 62 are respectively transmitted to the recording drivers 67 and 66 connected to the head 68 via the AND circuits 65 and 64.

Those AND circuits are switched on under the control of signals at the output 1 of respectively two bistable circuits 73 and 74. A delay circuit 75 or 76 is interconnected between each bistable circuit and the corresponding AND circuit. The driving device 70 is controlled by the signals of the outputs 1 of the bistable circuits 73 and 74 via an OR circuit 77. Switching of bistable circuits 73 or 74 to the condition 1 is controlled respectively by the output signal of two OR circuits 71 and 72 receiving some predetermined alarm signals concerning the tracking loops 1 and 2, respectively. In connection with the embodiment of the FIG. 3, the alarms A4 to A9, A11 and A13 were selected. Resetting of the bistable circuits 73 and 74 is performed via a triggered clock circuit 78 providing a pulse after a time period of TI following the last pulse which triggered it, such triggering pulses being provided by an OR circuit 79 whose inputs are connected to outputs of OR circuits 71 and 72.

The operation thereof is as follows: Multiplexed data are recorded and continuously erased at a time TI following their recording on the two tracks of the tape 57. During normal traffic, there is no alarm signal and the bistable circuits 73 and 74 are in the state 0, the AND circuits 64 and 65 are off and there is no recording on the tape 69 which is stopped.

If an alarm signal occurs, for example A5.2, it triggers the clock 78, sets the circuit 74 to the state 1, which effects starting of the controlled tape drive 70. Data read by the head 61 are transferred (with respect only to data read from the track 2, in the example case) to the recording circuit 66 after a delay R which is the delay dictated by the circuit 76 for switching the AND circuit 64 on. Such a delay is selected so as to allow sufficient time for the tape 69 reaching normal recording speed.

Recording on the tape 69 of data read from the tape 57 continues until time TI after alarm signal occurrence.

At this time, the clock 78 resets the circuit 74 and recording on the tape 69 is stopped, all data concerning the target tracked by the tracking loop 2 during the time TI-R preceding alarm occurrence having been transferred to the tape 69 for more permanent storage.

It will be realized that the recordng time TI on the tape 57 is selected so that the recording duration TI-R on the tape 69 is equal to the desired value, for example, about 1 or 3 minutes as specified in the discussion of the embodiment of FIG. 3.

In the above described embodiments, magnetic tapes are used as storage means. But it is obvious that any other storage device providing equivalent characteristics may be used. Particularly, in the case of the FIG. 4, a circulating memory could be used for replacing the looped tape.

Moreover, it is also obvious that, while in this description the triggering of the permanent storage by means of alarm signals has been assumed, such a triggering may also be achieved by any manual or automatic signal, for example, for extracting measurements of controlled traffic for statistical purposes. Obviously, the recording system must be fitted, particularly with respect to the storage capacity, to the data quantity to be recorded.

It will be realized that it is not necessary for the recording to be performed close to the radar.

It may be performed in the control tower and, in that case, data provided by the radar may be multiplexed with respect to each tracked target, and then multiplexed data corresponding to several targets may be multiplexed again to allow transmission over a single transmission channel. Decoding may be performed in the control tower according to well known techniques. Such data may also be transmitted to the pilots of the aircraft by radio link. Such information as ground speed and the distance to the touch-down point are of particular interest to the pilots of approaching aircraft.

While the principles of the invention have been described above in connection with specific embodiments, it is to be understood that the said description is made only by way of example and not as a limitation on the scope of the invention.

What is claimed is:

1. A radar surveillance system for a predetermined area comprising:
   a coherent monopulse Doppler radar having a fixed antenna pointing angle such that the radiation pattern thereof substantially covers said predetermined area for producing sum and difference video signals corresponding to substantially only moving targets;

means for tracking selected ones of the targets within said predetermined area for which video signals are supplied by said radar, said tracking means employing said sum and difference signals to derive selected data concerning said selected targets;

an alarm signal generator responsive to said tracking means and including preselected reference circuits to compare said selected data against corresponding preselected reference limits for generating an alarm signal when one item or more of said selected data reaches or exceeds a predetermined relationship with the corresponding reference limit;

first recording means for continuously recording said selected data from said tracking means, said first recording means being repetitive and adapted for retaining said selected data at least for a first predetermined holding period prior to any point of time during recording;

second recording means being non-repetitive and capable of providing a longer recording period than said first recording means;

and transfer control means responsive to said alarm signal for activating said second recording means to record said selected data during presence of said alarm signal.

2. Apparatus according to claim 1 further defined in that said transfer control means includes additional means for discontinuing the recording of said selected data in said first recording means and for causing said first recording means to retain data recorded therein during presence of said alarm signal.

3. Apparatus according to claim 2 in which said first recording means comprises at least one continuous-belt magnetic tape recorder having a writing head for recording said selected data and said additional means includes controllable erasing means for erasing recorded data after said first predetermined holding period from the time of recording, in the absence of said alarm signal, said erasing means being deactivated to retain said selected data during presence of said alarm signal.

4. Apparatus according to claim 3 in which said second recording means comprises a non-repetitive magnetic tape recorder adapted to record said selected data for a second predetermined period substantially greater than said first predetermined holding period.

5. Apparatus according to claim 4 in which said selected data are radar derived data including at least range, angular position, speed and acceleration.

6. Apparatus according to claim 1 in which additional means are provided within said transfer control means for continuously reading said selected data from said first recording means at a constant delay from the time of recording therein substantially equal to said first predetermined holding period, and for effecting recording of said data thereby read in said second recording means during presence of said alarm signal, said first recording means also including continuously operative erasing means for erasing said data after said reading but prior to recording of new selected data therein.

7. Apparatus according to claim 6 in which said first recording means comprises a continuous belt magnetic tape recorder having close-spaced reading, erasing and recording heads encountered in that order by any arbitrary point on the moving magnetic tape.

8. Apparatus according to claim 4 in which said first and second recording means include multi-track magnetic tape recorders having one track for recording each discrete data item of said selected data.

9. Apparatus according to claim 4 in which said first and second recording means are single track tape recorders and multiplexing means are included whereby all data items of said selected data may be recorded on a single track in a time sequence rapid compared to the rate of change of the fastest changing data item of said selected data.

10. Apparatus according to claim 7 in which said first and second recording means are single track tape recorders and multiplexing means are included whereby all data items of said selected data may be recorded on a single track in a time sequence rapid compared to the rate of change of the fastest changing data item of said selected data.

* * * * *